United States Patent
Phillipson (12)

(10) Patent No.: US 6,170,144 B1
(45) Date of Patent: Jan. 9, 2001

(54) METHOD OF MAKING A DECORATIVE CONTAINER

(75) Inventor: Brian H. Phillipson, Longwood, FL (US)

(73) Assignee: EnviroWorks, Inc., Apopka, FL (US)

( * ) Notice: Under 35 U.S.C. 154(b), the term of this patent shall be extended for 592 days.

(21) Appl. No.: 08/512,782

(22) Filed: Aug. 9, 1995

(51) Int. Cl.[7] ................................................... B23P 11/02
(52) U.S. Cl. .............................. 29/453; 47/66.1; D11/144
(58) Field of Search ................................... D11/143, 144, D11/152; 29/453; 47/66.1, 71, 72

(56) References Cited

U.S. PATENT DOCUMENTS

| | | |
|---|---|---|
| 340,027 | 4/1886 | Allen . |
| 1,409,336 | 3/1922 | Fahlman . |
| 1,421,628 | 7/1922 | Watkins . |
| 1,952,401 | 3/1934 | Wilson . |
| 2,785,508 | 3/1957 | Coleman, Jr. . |
| 2,790,269 | 4/1957 | Coleman, Jr. . |
| 3,079,037 | * 2/1963 | Schechter ................................ 47/71 |
| 3,101,857 | 8/1963 | Freedman . |
| 3,447,262 | 6/1969 | Uhl . |
| 4,369,598 | 1/1983 | Beckwith . |
| 4,664,285 | 5/1987 | Korcz et al. . |
| 4,706,833 | 11/1987 | Korcz et al. . |
| 4,880,130 | 11/1989 | Blake . |
| 4,955,499 | 9/1990 | Petty . |
| 5,226,586 | 7/1993 | Grone . |
| 5,318,821 | 6/1994 | Bradley, Jr. . |
| 5,349,739 | 9/1994 | Weder . |
| 5,403,634 | 4/1995 | Mauffette . |
| 5,414,959 | 5/1995 | Weder et al. . |

* cited by examiner

Primary Examiner—David P. Bryant
(74) Attorney, Agent, or Firm—Foley & Lardner

(57) ABSTRACT

A decorative container member has an enclosing side wall with a rim around an upper extremity of the side wall, the rim defining a downwardly extending outer portion. A decorative ring member is dimensioned so that at least a portion fits in overlapping relationship with the outside surface of the rim. The side wall of the container member and the ring member are provided with distinctively different decorative characteristics (i.e., texture, color or finish) so as to provide the desired contrast.

14 Claims, 5 Drawing Sheets

METHOD OF MAKING A DECORATIVE CONTAINER

BACKGROUND OF INVENTION

The present invention relates generally to decorative containers and methods for making such containers, and specifically relates to a construction for a molded plastic flower pot utilizing distinctively different decorative elements.

The prior art discloses a number of configurations for live plant and cut flower containers which utilize an added element to provide either a functional or decorative aspect, or both, to the container. In U.S. Pat. No. 3,447,262 to Uhl, there is disclosed a flower arranging container employing an arranging member which is attached to the upper rim of the flower pot to provide both a decorative element and also to permit cut flowers to be spaced across the opening of the flower pot. Similar collar arrangements are disclosed in U.S. Pat. Nos. 2,785,508 and 2,790,269 to Coleman. In U.S. Pat. No. 4,369,598, Beckwith discloses an open lid for a flower container to facilitate seed sprouting or plant culturing. Mauffette, in U.S. Pat. No. 5,403,634, discloses a collapsible flower vase using a collar at the upper extremity of the construction. In U.S. Pat. No. 4,955,499, Petty discloses a planter box employing a "Planter Update Device" which is attached to the rim of the planter box and surrounds a portion of its side.

The prior art also discloses containers used for purposes other than as flower pots or plant containers using rings for collars for various functional purposes. See the following U.S. Pat. Nos: 5,414,959 to Weder et al; U.S. Pat. No. 5,349,739 to Weder; U.S. Pat. No. 5,318,821 to Bradley, Jr.; U.S. Pat. No. 5,226,586 to Gröne; U.S. Pat. No. 4,880,130 to Blake; U.S. Pat. No. 4,706,833 to Korcz et al.; U.S. Pat. No. 4,664,285 to Korcz et al.; U.S. Pat. No. 3,101,857 to Freedman; U.S. Pat. No. 1,952,401 to Wilson; U.S. Pat. No. 1,421,628 to Watkins; U.S. Pat. No. 1,409,336 to Fahlman; and U.S. Pat. No. 340,027 to Allen.

SUMMARY OF INVENTION

The present invention is directed to a decorative container, such as a container for living plants (generally referred to as a "flower pot"), and to techniques for fabricating and assembling such containers so as to impart different decorative characteristics to an individual container while retaining certain desirable characteristics, such as the ability of the containers to nest together for shipment and storage.

In accordance with the method of the present invention, a decorative container is made by forming a container member having an enclosing side wall with a rim around an upper extremity of the side wall, the rim including a downwardly extending outer portion. A decorative ring member is formed and dimensioned so that at least a portion of the ring member fits in an overlapping relationship with an outside surface of the rim of the container member side wall. The container member side wall and the ring member are imparted with different decorative characteristics in order to impart a distinctively different "look" to the container with respect to prior art constructions. By way of example, the distinctively different characteristics may utilize different textures, finishes or colors, or combinations of those decorative characteristics. Additionally, the ring member may be formed with a different shape than the rim, so long as at least a portion of the ring member is dimensioned to fit in overlapping relationship with the outside surface of the rim.

To achieve the desired distinctive decorative appearance in the container member-ring member combination, the ring member is fitted onto the rim in the defined overlapping relationship.

Further in accordance with the present invention, to insure that the ring member stays in the overlapping position relative to the container member rim, the ring member is removably locked with the rim. This is achieved by molding a locking tab at an extremity of the ring member and then locking the tab around the extremity of the downwardly extending outer portion of the rim. In the preferred embodiment, the locking tab is molded with a camming surface at the extremity of the ring member, to facilitate the sliding of the ring member onto the rim during the fitting step. Preferably, the container member and the ring member are both molded of a resilient plastic material so that the ring member has sufficient resiliency to expand during sliding across the outside surface of the container member rim.

During a conventional molding process for containers of the type which are the subject of this invention, the rim is formed by making a radius of the plastic material between an upper extremity of the container side wall and the outside rim. In order to obtain the full advantage of the different decorative appearance between the ring member and the container, the ring member is provided with a portion that extends across the radius of the container member which forms the rim. Further, in order to maintain the ability of the container member to nest with other container members during shipment and storage, the radius portion of the ring member is dramatically tapered to an extremity which just encircles the radius of the container member, but avoids interference with a next adjacent container which may be in a nesting relationship.

When the container member and the ring member are fabricated from a resilient plastic material, it is preferred that the rim be shaped with an outwardly-facing concavity which is somewhat accentuated at the downward extremity of the rim. In a corresponding manner, the ring member is provided with an outwardly-facing concavity, the resilience of the plastic ring member being sufficient to flare outwardly temporarily while the ring member is being fitted onto the rim as the camming surface thereof passes along the outside surface of the rim to the locking position.

In the preferred form of a decorative flower pot made according to the present invention, there is also provided a water tray within which the flower pot rests, and which is also provided with a decorative ring member feature. The water tray ring member has a construction and decorative characteristic consistent with that employed in the construction of the decorative flower pot as described above.

DETAILED DESCRIPTION

Figure 1:
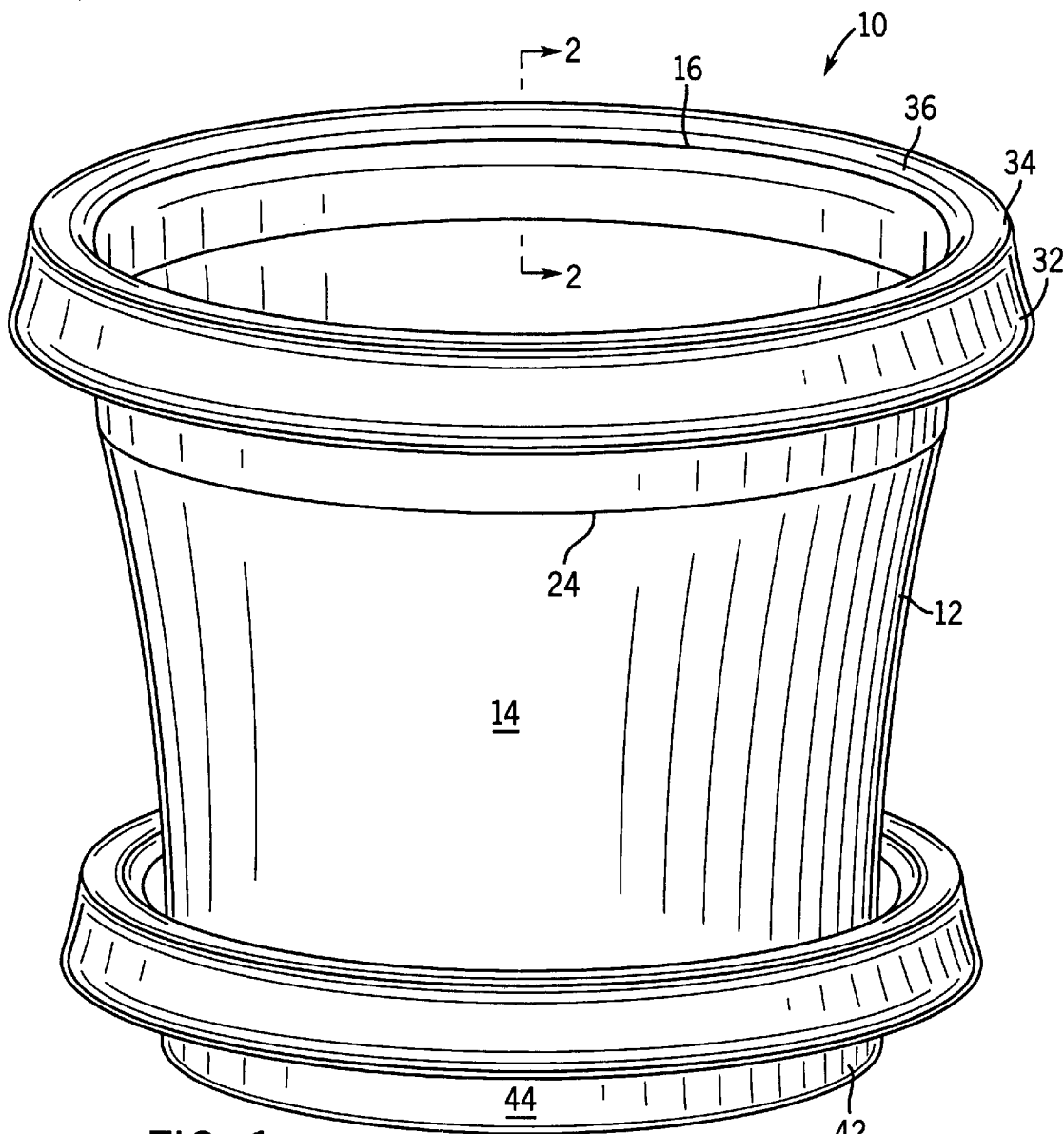
FIG. 1 is a perspective view of the preferred form of a flower pot and watering tray combination in accordance with the present invention.
Figure 2:
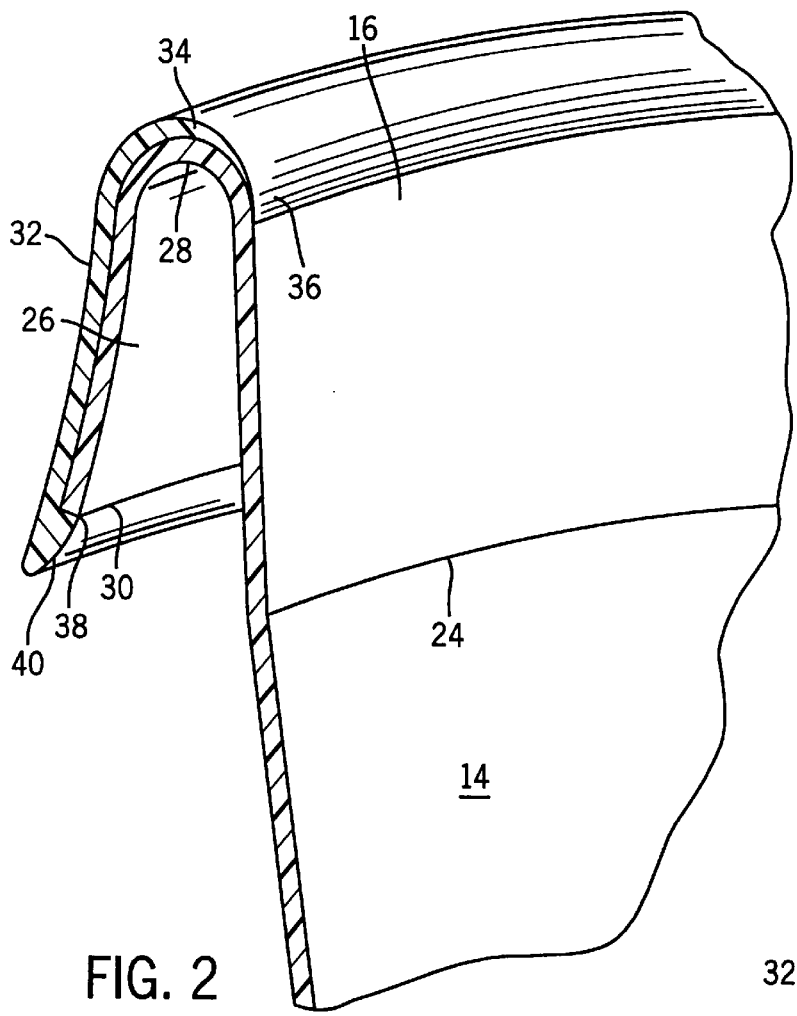
FIG. 2 is an enlarged perspective view of a cross-sectioned portion of the flower pot as shown in the combination of FIG. 1.
Figure 3:
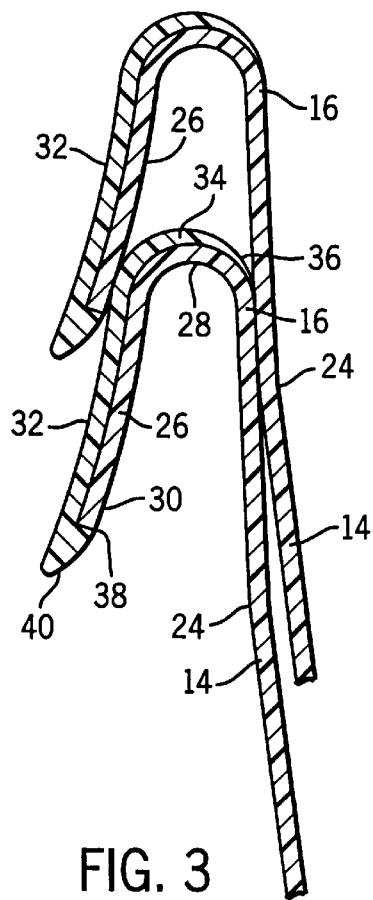
FIG. 3 is a cross section like that of FIG. 2, illustrating the nesting characteristics of the present invention.
Figure 4:
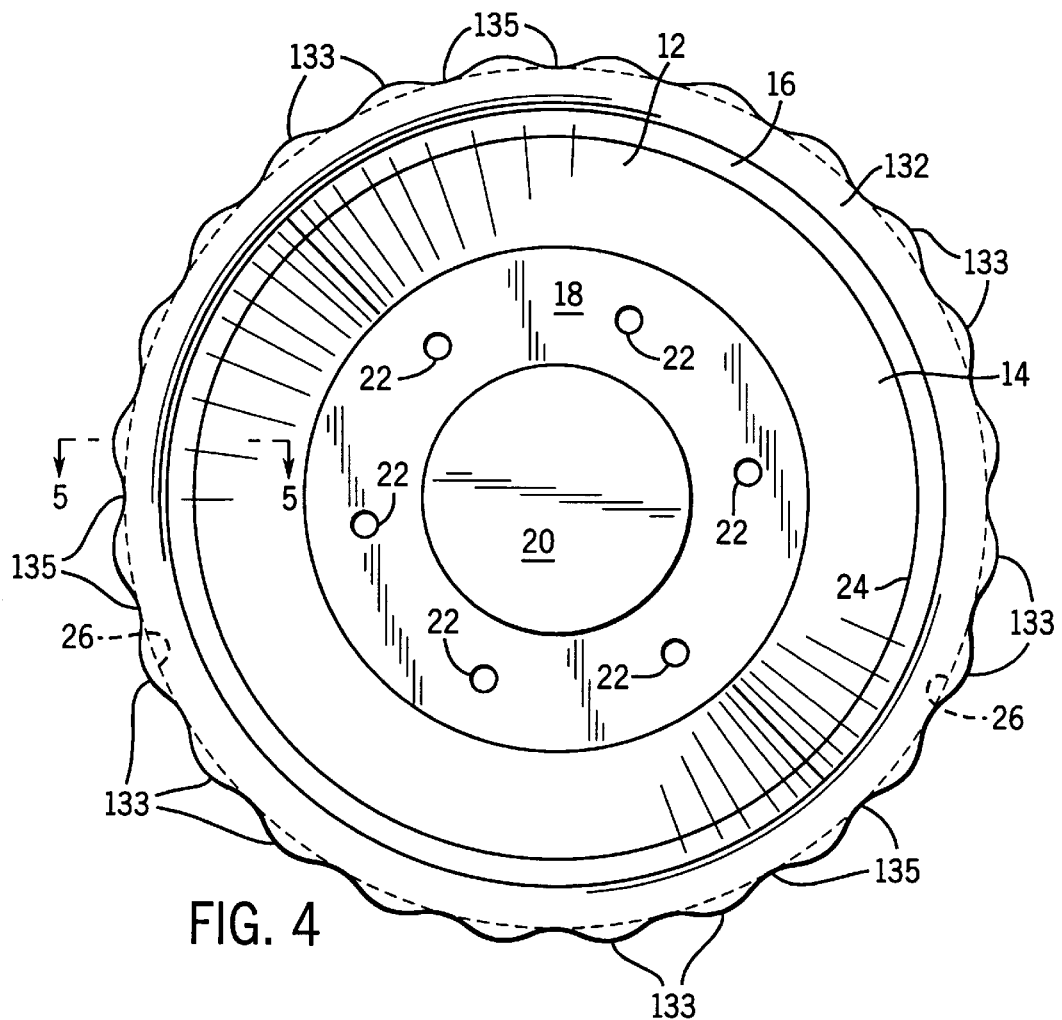
FIG. 4 is a top plan view of the flower pot of FIG. 1, showing an alternate ring member construction.

A preferred form of a flower pot and water tray combination in accordance with the present invention is shown in FIGS. 1–3 and partially in FIG. 4, the combination being referred to generally in FIG. 1 by the reference numeral 10. The combination 10 includes a decorative container 12 (i.e., a flower pot) preferably molded of a plastic material and which is defined by an enclosing side wall 14 and a bottom 18 (FIG. 4). The bottom has a raised land 20 (representing an indentation on the opposite side of the bottom) which is dimensioned to receive an upwardly extending portion of the bottom of the water tray 42, as is described in greater detail below with reference to FIG. 6.

The enclosing side wall 14 includes an upper extremity 16 and an intermediate "break" 24 at which the angularity of the side wall 14 is changed slightly (note FIG. 2).

With specific reference to FIGS. 2 and 3, the flower pot 12 further comprises a rim 26 which is integrally molded with the side wall 14 through a radius 28 the rim extending downwardly to a lower extremity 30 and having an outwardly-facing concavity. Preferably, the side wall 14, the bottom 18 and the rim 26 are all integrally molded of a suitable resilient plastic which is imparted with a first decorative characteristic—such as the texture, color or finish of the container 12—which is distinctively different from the decorative characteristic of a molded ring member, described next.

In accordance with this invention, there is provided a decorative ring member 32 which is molded and dimensioned so that at least a portion of the ring member fits in an overlapping relationship with the outside surface of the rim 26, the ring member being imparted with a second decorative characteristic (that is, texture, color or finish) which is distinctively different from the first decorative characteristic imparted to the side wall of the container so as to provide a decorative contrast between the two. As is shown in FIGS. 2 and 3, the ring member 32 has a locking tab 38 at the extremity of the ring member, the locking tab dimensioned to fit around the extremity 30 of the downwardly extending outer portion of the rim 26. Additionally, the locking tab includes a camming surface 40 to facilitate the sliding of the ring member 32 into place as shown in FIGS. 2 and 3. The ring member 32 includes a radius 34 that corresponds to the radius 28 of the rim 26, the radius 34 terminating in an overlapping lip portion which is tapered and dimensioned so as to avoid interference between the ring member 32 and another container extending in a nesting relationship inside of the side wall 14, as is shown in FIG. 3.

Figure 5:
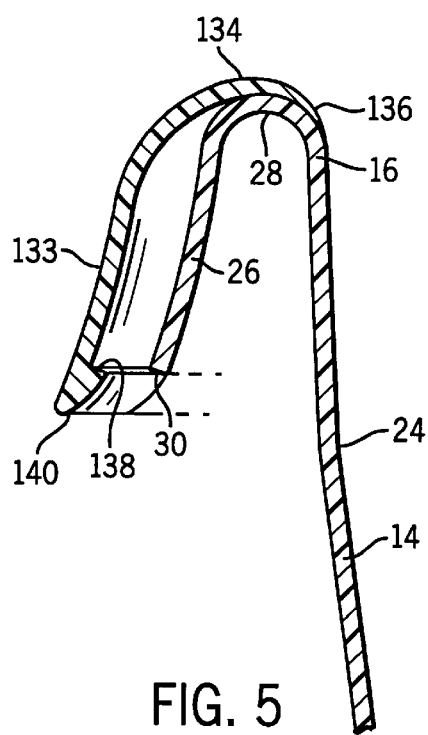
FIG. 5 is an enlarged cross sectional view of a portion of FIG. 4, taken along the line 5—5.

It will be appreciated by those skilled in the art that the appropriate selection of a different finish, texture or color for the ring member 32 relative to the finish, texture or color (or any combination of these) of the flower pot 12 will permit a flower pot having a unique and distinctive decorative appearance to be fabricated in a low cost manner out of relatively inexpensive plastics. Additionally, the ring member may be molded into different shapes, so long as a portion of the ring member fits in overlapping relationship with the rim 26 of the container 12. Such an alternate form of the ring member is shown in FIGS. 4 and 5, where the ring member is referred to generally by the reference numeral 132, all other reference numerals in FIGS. 4 and 5 corresponding to like elements of FIGS. 1–3. The ring member 132 in FIGS. 4 and 5 includes undulations 133 which extend outwardly away from the rim 26 as shown in FIG. 5, and intermediate portions 134 which engage the outside surface of the rim 26 in the same manner as described above with reference to FIGS. 2 and 3. While the undulations 133 extend out of engagement with the outside surface of the ring 26, the engaging portions 135 are sufficient to hold the ring member 132 in place, since the corresponding locking tab 138 (having a camming surface 140) engages the rim 26 in the same manner as described above with reference to the embodiment of FIGS. 1–3.

Figure 6:
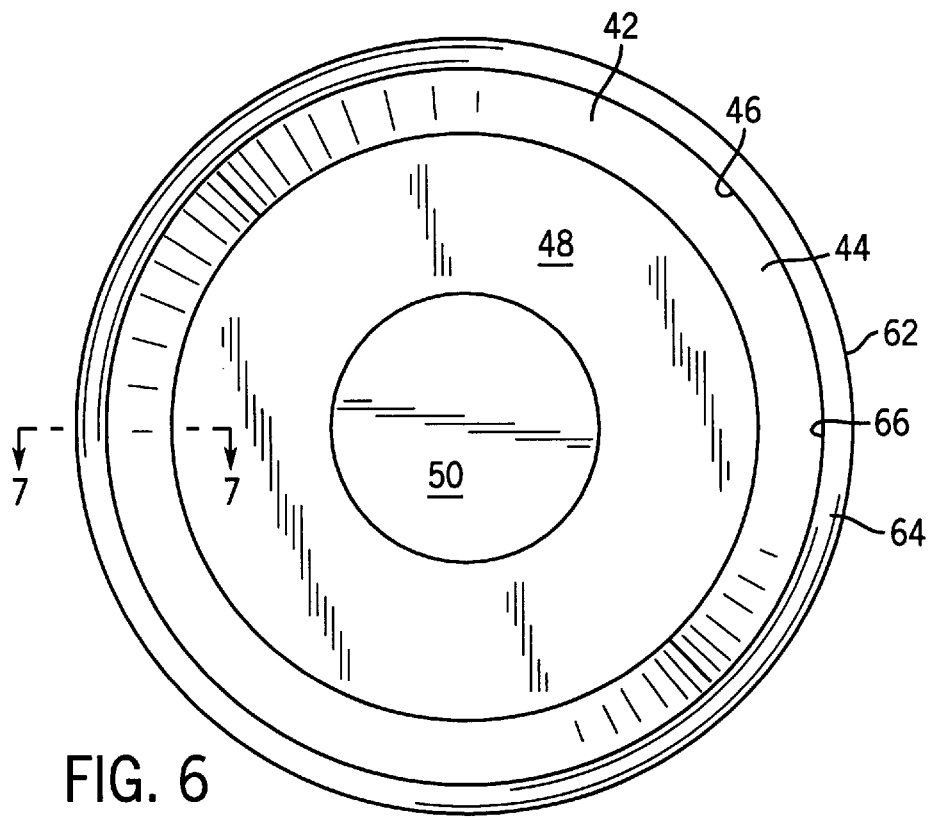
FIG. 6 is top plan view of the water tray portion of the combination shown in FIG. 1.
Figure 7:
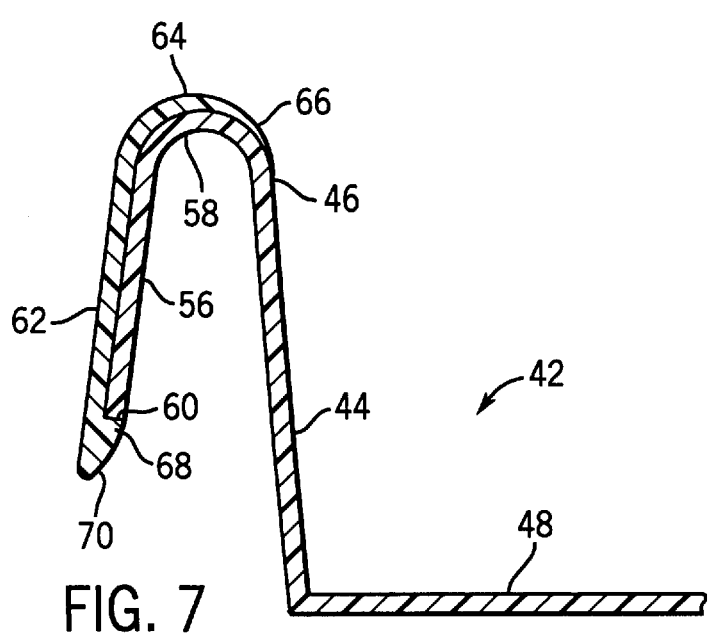
FIG. 7 is an enlarged cross sectional view of a portion of the water tray shown in FIG. 6, taken along the line 7—7.
Figure 8:
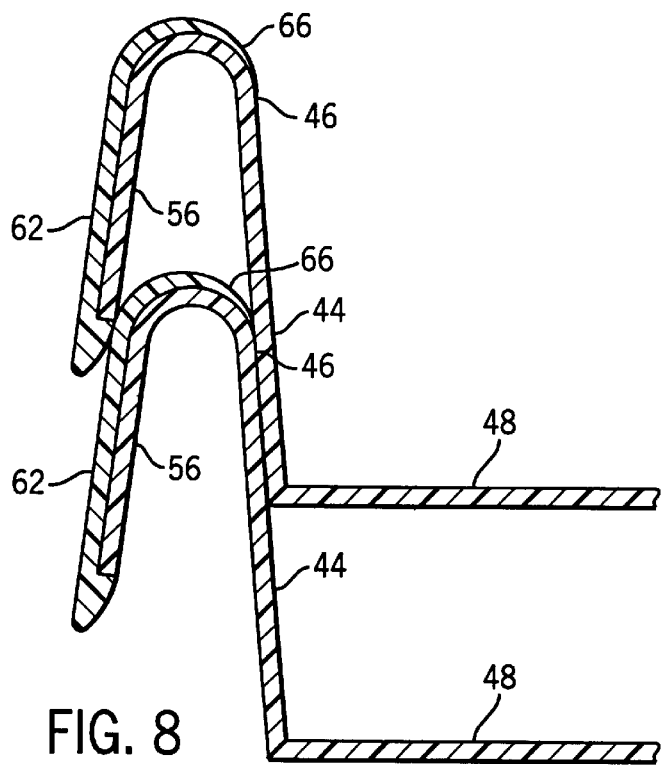
FIG. 8 is a cross sectional view like that of FIG. 7, illustrating the nesting characteristics of the water tray.

FIGS. 6, 7 and 8 illustrate the water tray 42 of FIG. 1, in which the water tray includes a side wall 44, a bottom 48 and a land 50 dimensioned to extend within the recess created by land 20 in the flower pot 12. The water tray side wall 44 includes an upper extremity 46 which includes a radius 58 defining a rim 56 extending to an extremity 60 (FIG. 7). In a manner similar to that of the flower pot 12 described above, the water tray 42 further includes a ring member 62 having a radius 64 and tapered lip 66 overlying the radius 58 and dimensioned to avoid interference with a nesting water tray, as shown in FIG. 8. The water tray ring member 62 also includes a locking tab 68 and a camming surface 70. In the same manner as was described above with reference to the flower pot 12, the side wall 44 of the water tray 42 is imparted with a decorative characteristic which in one specific example is the same as the decorative characteristic imparted to the side wall 14 of the flower pot 12. Additionally, the water tray ring member 62 is imparted with another, contrasting decorative characteristic which in the specific form is the same as the second decorative characteristic imparted to the flower pot ring member 32. By way of example, the side walls 14, 44 of the flower pot 12 and the water tray 42 may be imparted with a rough finish and a white coloration. To provide the desired contrast and by way of example only, the ring members 32 and 62 of the flower pot 12 and the water tray 42 may be imparted with a dark blue coloration and a smooth, glossy finish. It will of course be appreciated that the colors and finishes may be reversed, and that many other color combinations may be utilized. Additionally, different colors may be used for the side walls 14 and 44 and the ring members 32, 62 in the same flower pot-water tray combination.

Figures 9A, 9B:
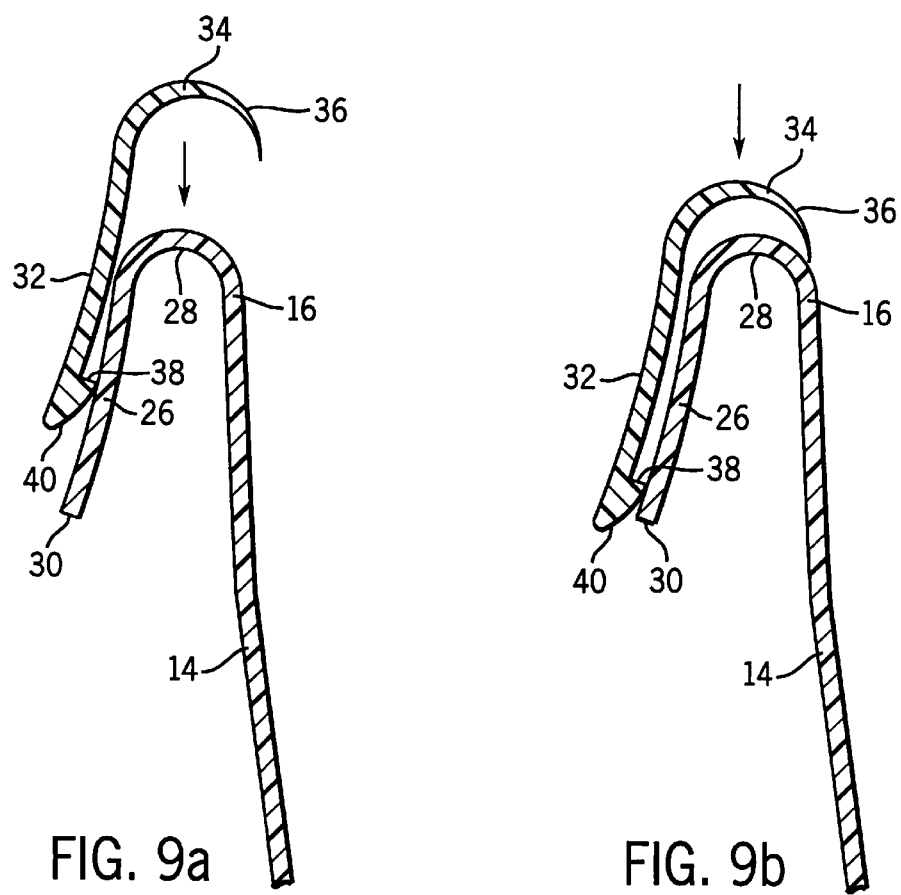
FIGS. 9(a) and 9(b) are cross sections similar to that of FIG. 2, illustrating the manner in which the decorative ring member is fitted onto the rim of the container member in accordance with the preferred embodiment.

FIGS. 9(a) and 9(b) illustrate the manner in which the ring members resiliently behave while being positioned onto the respective rim. In the example of FIG. 9(a), the ring member 32 is slid downwardly with the camming surface 40 moving across the outside surface of the rim 26. By selecting a resilient plastic for the ring member 32, the ring member slides along the outside surface of the rim 26 until the locking tab crosses the extremity 30 of the rim 26 (FIG. 9(b)) and then locks into place, as shown in FIG. 2.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for making a decorative container, comprising the steps of:

forming a container member having an enclosing side wall with a rim around an upper extremity of the side wall, the rim having a downwardly extending outer portion;

imparting a first decorative characteristic to the container side wall;

forming a decorative ring member and dimensioning at least a portion of the ring member so as to fit in overlapping relationship with an outside surface of the rim;

imparting a second decorative characteristic to an outside surface of the ring member, the second decorative characteristic being distinctively different from the first decorative characteristic imparted to the side wall;

fitting the ring member onto the rim in an overlapping relationship; and molding a locking tab at an outer extremity of the ring member, and locking the tab around an extremity of the downwardly extending outer portion of the rim.

2. The method recited in claim 1 wherein the locking tab molding step further comprises the step of forming a camming surface at an extremity of the ring member, and wherein the fitting step comprises sliding the camming surface along the outer surface of the downwardly extending outer portion of the rim.

3. The method recited in claim 1 wherein the ring member forming step comprises the step of molding the ring member of a resilient material.

4. The method recited in claim 1 wherein the decorative ring member forming step comprises molding the ring member so that only discontinuous portions of the outer extremity engage the outer portion of the rim when fitted thereto.

5. A method for making a decorative container, comprising the steps of:

forming a container member having an enclosing side wall with a rim around an upper extremity of the side wall, the rim having a downwardly extending concave outer portion;

imparting a first decorative characteristic to the container side wall;

forming a decorative ring member and dimensioning at least a portion of the ring member so as to fit in overlapping relationship with an outside surface of the rim;

imparting a second decorative characteristic to an outside surface of the ring member, the second decorative characteristic being distinctively different from the first decorative characteristic imparted to the side wall;

fitting the ring member onto the rim in an overlapping relationship; and wherein the container member forming step comprises the step of forming the rim with an outwardly-facing concavity, and wherein the ring member forming step comprises the step of forming the ring member with a downwardly-extending concavity which corresponds to the concavity of the container member rim outer portion.

6. A method for making a decorative flower pot and water tray combination, the method comprising the steps of:

molding a flower pot having an enclosed bottom and a side wall with a rim around an upper extremity of the side wall, the rim defining a continuous radius at the upper extremity of the side wall and extending downwardly along the outside of the side wall;

imparting a first decorative characteristic to the container side wall;

molding a decorative resilient ring member dimensioned to fit in overlapping relationship with the radius of the rim and across an outside surface of the downwardly extending portion of the rim;

imparting a second decorative characteristic to an outside surface of the ring member, the second decorative characteristic being distinctively different from the first decorative characteristic imparted to the side wall;

fitting the ring member onto the rim in an overlapping relationship; and molding a water tray dimensioned to receive the bottom of the flower pot.

7. The method recited in claim 6 further comprising the steps of:

molding a locking tab at an extremity of the ring member and locking the tab around an extremity of the downwardly extending outer portion of the rim; and forming a camming surface at an extremity of the ring member, so that the fitting step comprises sliding the camming surface along the outer surface of the downwardly extending outer portion of the rim.

8. The method recited in claim 6 wherein the water tray molding step comprises the steps of:

molding the water tray member with an enclosing side wall with a rim around an upper extremity of the side wall, the rim having a downwardly extending outer portion;

imparting the first decorative characteristic to the water tray member side wall;

molding a water tray resilient ring member and dimensioning at least a portion of the water tray ring member so as to fit in overlapping relationship with an outside surface of the rim of the water tray member;

imparting the second decorative characteristic to an outside surface of the water tray ring member; and fitting the water tray ring member onto the rim of the water tray member in overlapping relationship.

9. The method recited in claim 8 wherein the forming step for the flower pot decorative ring member comprises the steps of:

molding an overlapping lip portion dimensioned to overlap the radius of the flower pot rim; and tapering and dimensioning the overlapping lip so as to permit the container member side wall to receive another container member in nesting relationship therewith.

10. The method recited in claim 8 wherein the step of forming the water tray decorative ring member comprises the steps of:

molding an overlapping lip portion dimensioned to overlap the radius of the water tray rim; and tapering and dimensioning the overlapping lip of the water tray decorative ring member so as to permit the water tray member side wall to receive another water tray member in nesting relationship therewith.

11. The method recited in claim 8 further comprising the steps of:

molding a locking tab at an extremity of the water tray ring member and locking the tab around an extremity of the downwardly extending outer portion of the rim; and forming a camming surface at an extremity of the water tray ring member so that the water tray member-ring member fitting step comprises sliding the camming surface along the outer surface of the downwardly extending outer portion of the water tray rim.

12. The method recited in claim 6 wherein the container member forming step comprises the step of forming the rim with an outwardly-facing concavity.

13. The method recited in claim 12 wherein the ring member forming step comprises the step of forming the ring member with a concavity which corresponds to that of the container member rim.

14. A method for making a decorative plant container comprising the steps of:

forming a container member having an enclosing side wall with a rim around an upper extremity of the side wall, the rim having a downwardly extending outer portion and a radius at the top of the side wall;

imparting a first decorative characteristic to the container side wall;

forming a decorative ring member and dimensioning at least a portion of the ring member so as to fit in overlapping relationship with an outside surface of the rim by molding an overlapping lip portion and dimensioning the overlapping lip portion to both overlap the radius of the rim and also avoid interference between the ring member and another container member extending in nesting relationship inside of the side wall;

imparting a second decorative characteristic to an outside surface of the ring member, the second decorative characteristic being distinctly different from the first decorative characteristic imparted to the side wall of the container member; and fitting the ring member on to the rim in an overlapping relationship and molding a locking tab at an outer extremity of the ring member which substantially surrounds the downwardly extending outer portion of the container member, and locking the tab around an extremity of the downwardly extending outer portion of the rim of the container member.

\* \* \* \* \*